United States Patent [19]
Kumpfbeck et al.

[11] 3,815,088
[45] June 4, 1974

[54] VEHICLE ALARM CIRCUIT RESPONSIVE TO SELECTED BATTERY VOLTAGE TRANSIENTS

[75] Inventors: Richard J. Kumpfbeck, Dix Hills; Aristide J. Vitolo, Floral Park, both of N.Y.

[73] Assignee: Sheldon Aircraft Products Corp., Whitestone, N.Y.

[22] Filed: Dec. 4, 1972

[21] Appl. No.: 311,461

[52] U.S. Cl............. 340/63, 180/114, 307/10 AT, 340/248 B, 340/276
[51] Int. Cl............................................ B60r 25/10
[58] Field of Search............ 340/63, 64, 248 B, 249, 340/276, 333; 307/10 AT, 233; 180/114

[56] References Cited
UNITED STATES PATENTS

| | | | |
|---|---|---|---|
| 3,189,788 | 6/1965 | Cady .............................. | 340/248 B |
| 3,524,121 | 8/1970 | Nolan et al. ....................... | 340/249 |
| 3,533,064 | 10/1970 | Perelman .............................. | 340/63 |
| 3,671,934 | 6/1972 | Teich.................................. | 340/63 |

Primary Examiner—John W. Caldwell
Assistant Examiner—Joseph E. Nowicki
Attorney, Agent, or Firm—Bauer and Amer

[57] ABSTRACT

An alarm circuit for providing an audible indication of unauthorized entry into a vehicle includes a sensing circuit, a solid state switching element and an internal energy source in an integral assembly. When the alarm circuit is enabled, the control port of the switching element responds via the sensing circuit to the negative voltage transient at the car battery upon entry (caused by the initial surge current to illuminate the interior courtesy lights) to render the switching element conductive, thereby applying the potential of an internal battery across a horn, buzzer or the like.

In accordance with further aspects of the present invention, a charging circuit for the internal battery and apparatus for triggering an alarm responsive to a disconnection of the alarm circuit from the car or its battery are provided.

13 Claims, 1 Drawing Figure

VEHICLE ALARM CIRCUIT RESPONSIVE TO SELECTED BATTERY VOLTAGE TRANSIENTS

DISCLOSURE OF THE INVENTION

The present invention relates to security apparatus and, more specifically, to an electronic alarm circuit for protecting a motor vehicle or the like.

The theft of automobiles, trucks and other vehicles, and the goods contained therein, represents perhaps the most common form of illicit activity. Accordingly, unauthorized entry of motor and other vehicles has been the focus of much attention, and numerous warning devices have been conceived and proposed. However, such apparatus has typically been expensive; difficult to install; ineffective, e.g., as defeated by theft of the automobile battery which served, as well, as the energy sources for the alarm unit; operative with fragile margins; and/or otherwise unsatisfactory.

It is, therefore, the primary object of the present invention to provide an improved vehicle protecting alarm circuit.

More specifically, an object of the present invention is the provision of an alarm circuit which is self contained, which is readily affixed to a vehicle as in a fender thereof, and which operates reliably.

It is a further object of the present invention to provide an alarm circuit which includes an internal energization source and which provides an audible alarm output indication upon disconnection from the automobile battery or tampering with the circuit's mechanical connection to the vehicle.

The above and other objects of the present invention are realized in a specific illustrative embodiment thereof, wherein a self-contained circuit housing is affixed to a vehicle via an electrical key switch. The circuit includes a battery serially connected to the switch contacts, a horn or other audible generator, and a controlled switch such as a silicon bidirectional thyristor (herein "triac"). A series tuned circuit connects the triac gate cathode control port to the vehicle battery.

When the vehicle is opened without disabling the horn energizing connection to the battery (i.e., without shifting the position of the transfer key switch), the negative voltage transient at the automobile battery terminals, caused by the initial current surge to illuminate the interior car courtesy lights, triggers the triac. Accordingly, the internal battery potential is applied across the horn which thus emits its typically loud sound. The triac latches in this mode until the alarm is achkowledged (by operating the key switch).

The alarm circuitry further includes a circuit for charging the internal battery when the alarm is deactivated.

In accordance with a further aspect of the present invention, the audible alarm is also sounded in response to any disconnection of the alarm circuit connection to the automobile battery or of the alarm circuit from the automobile.

The above and other objects, features and advantages of the present invention will become more apparent from the following detailed description of a specific embodiment thereof, presented hereinbelow in conjunction with the accompanying drawing which schematically depicts the alarm circuitry in accordance with the principles of the present invention.

DETAILED DESCRIPTION OF THE PREFERRED EMBODIMENT

Figure 1:
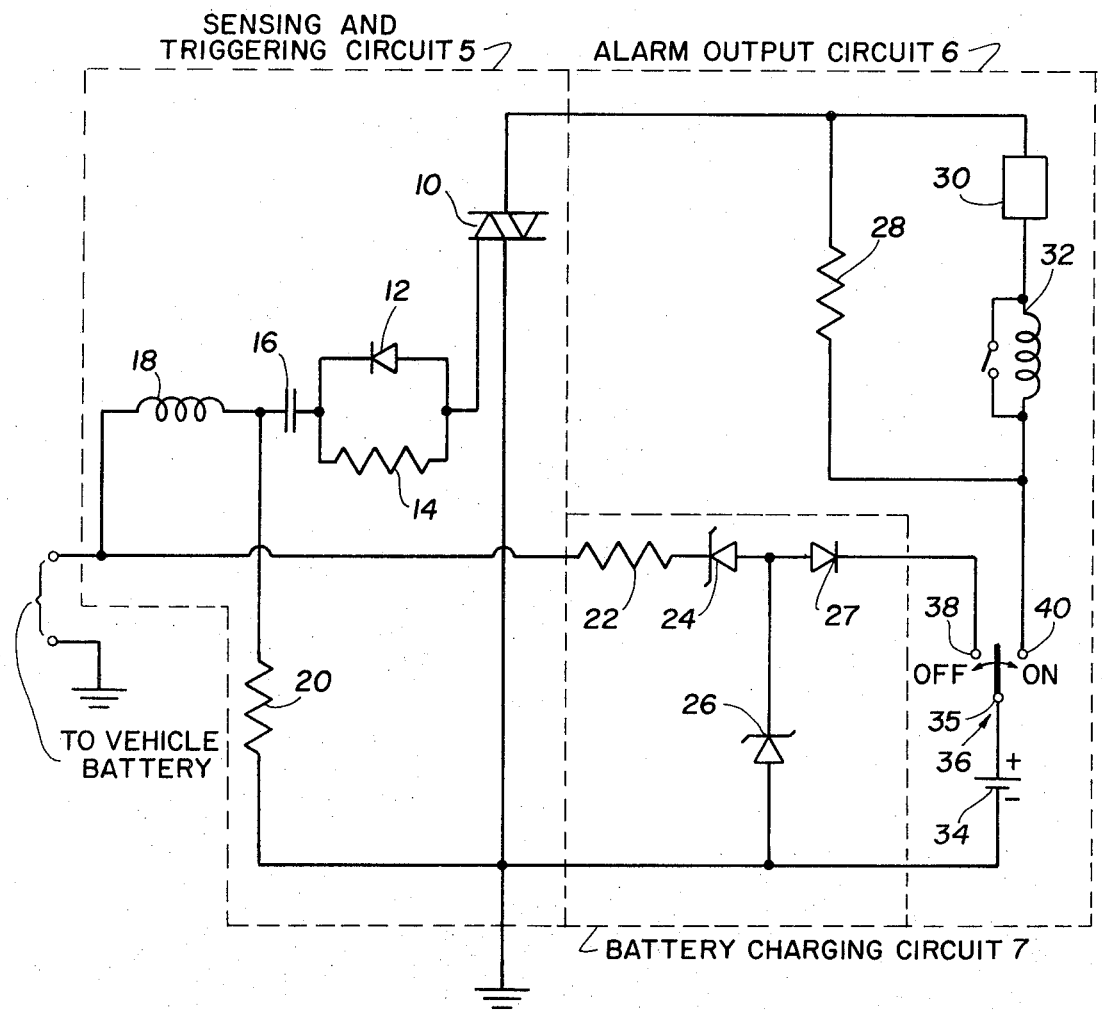

Referring now to FIG. 1, there is shown a vehicle-protecting alarm circuit which includes three major subportions, viz., a sensing and triggering circuit 5, an alarm output circuit 6 and a battery charging circuit 7, there being some circuit elements common to the FIG. 1 circuit subportions. All circuit elements of the composite alarm system of FIG. 1 are self contained within an integral housing which is secured to a metallic outer part of the vehicle, e.g., a fender. The housing and key body provide an electrical ground connection between the FIG. 1 alarm unit and the automobile battery.

Examining first the alarm output circuitry 6, a solid state control switch, such as a silicon bidirectional thyristor (i.e., a triac), is serially connected with a horn or other electronic audible output element 30; a quiescently conductive thermal flasher 32, which is alternately characterized by a low and a high impedance when current flows therethrough, contacts 35 and 40 of a transfer key switch 36 and a battery 34. The triac is selectively triggered by an input pulse sensed by the sensing and triggering circuit 5 and is rendered conductive thereby. When the triac 10 conducts, substantially the full potential provided by the battery 34 is applied across the horn 30 which emits a loud sound. After a relatively short period of time, the thermal flasher 32, e.g., a bimetal construction, heats and becomes a high impedance, thereby reducing the voltage across the horn 30, thus deactivating it. Some short time later when the thermal flasher 32 cools, it again becomes a short circuit to reactivate the horn 30 which then produces its audible output.

A resistor 28 is connected between the anode of the triac 10 and the key switch terminal 40. The resistor provides sustaining current to the triac from the battery 34 during the periodic intervals when the horn is open circuited such that the triac never ceases conduction, once triggered, until the alarm is acknowledged by moving the key switch 36 transfer member 35 to its alternate contact 38.

Referring now to the battery charging circuit 7, when the key switch 36 is disposed in its alternate position wherein the transfer member 35 engages the contact 38, the alarm circuit battery 34 is connected to the vehicle battery by a resistor 22, zener diodes 24 and 26, and a silicon diode 27. Battery potential from the vehicle battery is reduced by the zener diode 24, and the battery 34 charging voltage is established by the zener potential of the diode 26. The resistor 22 serves to limit current in the charging conduction path. Thus, with the key switch 36 positioned as hereinabove discussed, the alarm circuit is not activated as when the automobile is being driven by authorized persons or is in a secure environment, and the circuit of FIG. 1 operates to charge the battery 34.

The sensing and triggering circuit 5 is connected between the principal vehicle battery and the triac control port, i.e., the gate to cathode conduction path of the triac 10. The circuitry 5 is designed to initiate anode conduction in triac 10 in response to any unauthorized entry into the vehicle. To this end, it is to be observed that the automobile battery supplies electrical energy to all interior courtesy lamps in the vehicle which, in common with other incandescent bulbs, exhibit a relatively low impedance when energized. Accordingly, when an automobile is entered, the low impedance courtesy lights in the car are operatively connected to the vehicle battery and extract an initial current surge therefrom, hence, developing a negative voltage transient across the vehicle battery terminals. The sensing and triggering circuit 5 includes a capacitor 16 and an inductor 18 connected between a vehicle battery terminal and the gate of the triac 10, the resonant circuit being tuned to the frequency band characterizing the negative battery voltage transient. One useful and operative frequency is 50 khz. with a 3 DB band pass of 20 khz. Further, a shunt network comprising a diode 12 and a resistor 14 is connected intermediate the capacitor 16 and the gate of the triac 10. The capacitor 16 is initially charged to the potential of the vehicle battery via the resistor 14 and the triac control port (gate).

The composite FIG. 1 alarm circuit is armed, as when the vehicle is left unattended, by shifting the key switch transfer member 35 to engage the contact 40. Thereafter, if the vehicle is entered before the key switch is restored, the negative voltage transient resulting at the vehicle battery terminals is coupled by the resonant circuit 16, 18 and the diode 12 to the gate of the triac 10, thereby rendering the triac conductive to commence the audible alarm syndrome discussed hereinabove. The selective triggering circuitry prevents coupling of the clock pulse and other spurious signals to the gate of the triac. The audible output indication may not be terminated other than by restoring the key switch transfer member 35 to engage the contact 38, and this is so, as discussed below, even if the connection to the vehicle battery is severed.

With the capacitor 16 charged, and the key switch 36 in its armed state, the alarm output sequencing is produced if the connection between the composite alarm circuit of FIG. 1 and the vehicle battery is broken, as by an attempt to defeat the alarm system or to burglarize the vehicle battery. When the battery connection is severed, a resistor 20 connecting the capacitor 16 to ground discharges capacitor 16 through the triac control port and diode 12, thereby rendering the triac conductive. Accordingly, since the triac operates in a latching mode, the audible output alarm indication and sequencing is produced, and persists until acknowledgment.

The above discussion of the alarm circuit has, therefore, demonstrated that the alarm circuit of FIG. 1 operates in a reliable and secure manner, to provide an audible indication of unauthorized entry into the vehicle. Moreover, the apparatus provides an audible indication responsive to any attempt to defeat the protective system by disconnection from the vehicle battery or fender.

The foregoing discussion is merely illustrative of the principles of the present invention and there are many modifications, changes and adaptations thereof which will be readily apparent to those skilled in the art without departure from the spirit and scope of the present invention.

Although a solid state control switch, such as the thyristor, has been disclosed, it will be apparent to those skilled in the art that other equivalent structures may be utilized. Obviously, an SCR or a unijunction transistor may be utilized in the circuit in substitution of the thyristor by the mere change in values of the related elements.

What is claimed is:

1. In a vehicle-protecting alarm circuit operative in response to selected voltage transients at the vehicle battery terminals, the combination comprising
controlled switching means having a main conduction port and a control port,
a power source means independent of the vehicle battery,
audible alarm and transfer switch means serially connected to said power source means and said main conduction port, said transfer switch means having a plurality of positions,
means connected with and for selectively triggering said control port of said controlled switching means responsive to selected voltage transients at the vehicle battery terminals and responsive to disconnection of said alarm circuit therefrom, said selective triggering means comprises a series resonant circuit including a diode.

2. A vehicle-protecting alarm circuit in accordance with claim 1,
wherein said selective triggering means includes capacitive coupling means and a capacitor discharging resistor connected to said capacitive coupling means.

3. A vehicle-protecting alarm circuit in accordance with claim 2,
wherein said transfer switch means is key switch means.

4. A vehicle-protecting alarm circuit in accordance with claim 3,
wherein said controlled switching means comprises a solid state control switch.

5. A vehicle-protecting alarm circuit in accordance with claim 1,
wherein said selective triggering means includes capacitive coupling means and a capacitor discharging resistor connected to said capacitive coupling means.

6. A vehicle-protecting alarm circuit in accordance with claim 1, including
charging means for charging said power source means, said charging means being serially connected to said power source through said transfer switch means when said transfer switch means is in one of its positions.

7. A vehicle-protecting alarm circuit in accordance with claim 6,
wherein said transfer switch means is key switch means.

8. A vehicle-protecting alarm circuit in accordance with claim 7,
wherein said power source means comprises a battery integral with said alarm circuit and distinct from said vehicle battery,
and said key switch means comprises transfer switching means for selectively connecting said battery to one of said controlled switching mean ports or to said charging means.

9. A vehicle-protecting alarm circuit in accordance with claim 1, including
periodic circuit interrupter means serially connected to said audible alarm means,
said controlled switching means comprising a thyristor.

10. A vehicle-protecting alarm circuit in accordance with claim 9, wherein said thyristor is of the silicon bidirectional type.

11. A vehicle-protecting alarm circuit in accordance with claim 6,
wherein said charging means includes a zener diode in said serial connection to said power source.

12. A vehicle-protecting alarm circuit in accordance with claim 3,
wherein said controlled switching means comprises a silicon bidirectional tyristor,
said power source means comprises a battery integral with said alarm circuit and distinct from said vehicle battery,
charging means for charging said power source means,
said key switch means comprises transfer switching means for selectively connecting said battery to one of said controlled switching means ports or to said charging means,
periodic circuit interrupter means serially connected to said audible alarm means.

13. A vehicle-protecting alarm circuit in accordance with claim 12, including
said charging means including a zener diode in said serial connection to said power source.

* * * * *